United States Patent
Chan et al.

(10) Patent No.: US 10,998,976 B2
(45) Date of Patent: May 4, 2021

(54) PROCESS FOR EXTENDING OPERATING TEMPERATURE RANGE OF GIGABIT PLASTIC OPTICAL FIBER

(71) Applicant: The Boeing Company, Chicago, IL (US)

(72) Inventors: Eric Y. Chan, Mercer Island, WA (US); Dennis G. Koshinz, Bellevue, WA (US); Kim Quan Anh Nguyen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/551,282

(22) Filed: Aug. 26, 2019

(65) Prior Publication Data

US 2021/0067250 A1   Mar. 4, 2021

(51) Int. Cl.
*H04B 10/25* (2013.01)
*G02B 6/02* (2006.01)
(Continued)

(52) U.S. Cl.
CPC ....... *H04B 10/25891* (2020.05); *B29C 71/02* (2013.01); *B29D 11/00663* (2013.01);
(Continued)

(58) Field of Classification Search
None
See application file for complete search history.

(56) References Cited

U.S. PATENT DOCUMENTS

| 4,913,817 A * | 4/1990 | Tsushima | B01D 69/10 210/500.27 |
| 2002/0018623 A1* | 2/2002 | Cullen | C03C 23/0095 385/37 |

(Continued)

FOREIGN PATENT DOCUMENTS

WO   2019050045 A1   3/2019

OTHER PUBLICATIONS

Heinzmann, "Temperature Dependence of Plastic Clad Silica (PCS) Fiber Characteristics", 1986, Proceedings vol. 0584, Optical Fiber Characteristics and Standards; https://doi.org/10.1117/12.950964 Event: 1985 International Technical Symposium/ Europe, 1985, Cannes, France (Year: 1986).*

(Continued)

*Primary Examiner* — Darren E Wolf
(74) *Attorney, Agent, or Firm* — Ostrager Chong Flaherty & Broitman P.C.

(57) ABSTRACT

A process to enhance the performance of plastic optical fiber to operate with a high data rate (e.g., at least 1 gigabit per second) at high temperature (e.g., 100 degrees Celsius) for airplane avionic systems. Gigabit plastic optical fiber has a core including a dopant that enables data transmission at gigabit rates. The enhancement process uses rapid thermal cooling of the gigabit plastic optical fiber to stabilize the polymer matrix of the fiber. This rapid cooling treatment blocks dopant diffusion in a high-temperature environment, thereby avoiding degradation of the fiber's bandwidth and optical loss characteristic. Such degradation typically occurs in gigabit plastic optical fiber having core and cladding made of transparent carbon-hydrogen bond-free perfluorinated polymer.

20 Claims, 9 Drawing Sheets

(51) Int. Cl.
  *G02B 6/42* (2006.01)
  *B29D 11/00* (2006.01)
  *B29C 71/02* (2006.01)
  *H04B 10/40* (2013.01)
  *B64F 5/10* (2017.01)

(52) U.S. Cl.
  CPC ............ *B64F 5/10* (2017.01); *G02B 6/02038* (2013.01); *G02B 6/4246* (2013.01); *H04B 10/40* (2013.01)

(56) References Cited

U.S. PATENT DOCUMENTS

| | | | |
|---|---|---|---|
| 2002/0035212 A1* | 3/2002 | Rodriguez-Parada | ........................ C08L 51/003 525/276 |
| 2004/0097676 A1* | 5/2004 | Boutevin | .............. C08F 234/02 526/249 |
| 2005/0062181 A1 | 3/2005 | Walker | |
| 2008/0187275 A1 | 8/2008 | Schuepbach et al. | |
| 2015/0274868 A1* | 10/2015 | Hintzer | ................... C08L 27/18 524/805 |
| 2019/0140761 A1 | 5/2019 | Chan et al. | |
| 2020/0264365 A1 | 8/2020 | Koike et al. | |

OTHER PUBLICATIONS

Inoue et al., "Unconventional plastic optical fiber design for very short multimode fiber link," Optics Express, vol. 27, No. 9, Apr. 29, 2019.
Asahi Glass Co., Ltd., "The world's fastest Plastic Optical Fiber Fontex", New product introduction, AGC Electronics, Version Mar. 24, 2010E (2010).
Thorlabs, "Graded-Index Polymer Optical Fiber (GI-POF", Datasheet (2014), pp. 1100-1101.
Partial European Search Report dated Dec. 16, 2020 in European Patent Application No. 20188923.5 (European counterpart to the instant U.S. patent application).

\* cited by examiner

PROCESS FOR EXTENDING OPERATING TEMPERATURE RANGE OF GIGABIT PLASTIC OPTICAL FIBER

BACKGROUND

The technology disclosed herein generally relates to fiber optical networks that enable communication between electrical components.

An optical fiber is a cylindrical dielectric waveguide that transmits light along its axis. The fiber consists of a transparent core surrounded by a transparent cladding layer (hereinafter "cladding"), both of which are made of dielectric materials. Light is kept in the core by the phenomenon of total internal reflection. To confine the optical signal in the core, the refractive index of the core is greater than that of the cladding. The boundary between the core and cladding may either be abrupt, as in step-index fiber, or gradual, as in graded-index fiber. Optical fibers can be made of glass or plastic.

A plastic optical fiber capable of transmitting data at rates faster than 1 gigabits per second will be referred to herein as a "gigabit plastic optical fiber" (GbPOF). Gigabit plastic optical fiber has a core and cladding made of transparent carbon-hydrogen bond-free perfluorinated polymer. The perfluorinated polymer is ductile and does not break during tight cable bending. Commercially available examples of GbPOF have core diameters of 50±5, 62.5±5 and 120±5 microns and a cladding diameter of 490±10 microns. In contrast to a pure silica GOF core, a multi-mode GbPOF with the same core diameter is more imperfect with long random polymer chains in spaghetti shapes. These polymer chains create strong forward mode coupling and result in less reflected light that can interfere with the laser source. The strong mode coupling in a GbPOF core also reduces the coherency of the laser source and results in minimal modal interference along the fiber length.

For the next generation of commercial airplanes, the avionics systems will include robust GbPOF for high-data-rate networks. But existing commercially available GbPOF can operate only up to 70 degrees Celsius, which is not suitable for use in avionics systems which operate at a temperature of 100 degrees Celsius.

One existing solution is to use multi-mode glass optical fiber. The drawbacks of using multi-mode glass optical fiber include the following:

(1) As compared to GbPOF, multi-mode glass optical fiber has the problem that of modal noise in an optical link that uses a gigabit transceiver with high-spectral-purity distributed feedback lasers. The GbPOF has a long chain of polymer in the fiber structure which homogenizes the propagation modes of the high-speed optical signal, eliminating the modal noise concern with the optical signal from distributed feedback lasers.

(2) Multi-mode glass optical fiber has a smaller diameter (about 125 microns) as compare to GbPOF which has a 500-micron diameter. Thus, the multi-mode glass optical fiber is more fragile and easy to be damaged during installation. Glass optical fiber breakage has been a well-known problem that gives rise to high maintenance and installation costs in airplane production.

Another existing solution is to develop customized high-temperature GbPOF. The drawbacks of customized high-temperature GbPOF are the following:

(1) There is no proven polymer fabrication process that has made commercially available GbPOF capable of transmitting data at a high rate at an operating temperature of 100 degrees Celsius (hereinafter "100° C.").

(2) The current commercial fiber optic market's economy of scale is not supporting an infrastructure for a viable supplier of high-temperature GbPOF. As a result, the customized GbPOF is not a solution to the problem of having a reliable supply of high-temperature GbPOF for future high-data-rate avionics systems.

A process capable of extending the operating temperature range of existing commercially available GbPOF would be useful in the manufacture of high-data-rate fiber optical networks.

SUMMARY

The subject matter disclosed in some detail below is directed to a process to enhance the performance of plastic optical fiber to operate with a high data rate (e.g., at least 1 gigabit per second) at high temperature (e.g., 100° C.) for airplane avionic systems. Gigabit plastic optical fiber has a core including a dopant that enables data transmission at gigabit rates within an operating temperature range. The enhancement process proposed herein uses thermal cooling of the gigabit plastic optical fiber to stabilize the polymer matrix of the fiber. This rapid cooling treatment blocks dopant diffusion in a high-temperature environment, thereby avoiding degradation of the fiber's optical transmission characteristic (e.g., unacceptable increase in the optical loss characteristic and bandwidth reduction of the fiber). Stabilizing the dopant's distribution inside the GbPOF by a thermal cooling process enables the GbPOF to operate with a high data rate at up to 100° C.

Although various embodiments of a process for extending the operating temperature range of plastic optical fiber capable of transmitting data at a high rate (e.g., at least one gigabit per second) will be described in some detail below, one or more of those embodiments may be characterized by one or more of the following aspects.

One aspect of the subject matter disclosed in detail below is a process for extending the operating temperature range of plastic optical fiber, the method comprising: (a) placing a loop of plastic optical fiber inside a thermal chamber, which plastic optical fiber has a core with dopant distributed in a polymer matrix such that the plastic optical fiber has a high-data-rate capability at a first temperature but not at a second temperature which is higher than the first temperature; (b) decreasing a temperature inside the thermal chamber until a third temperature lower than the first temperature is reached; (c) maintaining the third temperature inside the thermal chamber for a first period of time sufficient to cause the plastic optical fiber to develop the high-data-rate capability at the second temperature; (d) increasing the temperature inside the thermal chamber until a fourth temperature lower than the first temperature and higher than the third temperature is reached; (e) maintaining the fourth temperature inside the thermal chamber during a second period of time subsequent to the first period of time; and (f) removing the loop of plastic optical fiber from the thermal chamber.

In accordance with one embodiment of the process described in the immediately preceding paragraph, the second temperature is 100 degrees Celsius, the third temperature is in a range of −55° C. to −65° C. and the fourth temperature is room temperature. (As used herein, the term "room temperature" means 20° C. to 25° C.) The plastic optical fiber is graded-index plastic optical fiber having a core and a cladding made of a transparent carbon-hydrogen bond-free perfluorinated polymer. Prior to the cooling treatment, the plastic optical fiber does not have a data rate capability of at least 10 gigabits per second at 100° C. Following the cooling treatment, the plastic optical fiber has a data rate capability of at least 10 gigabits per second at 100° C.

Another aspect of the subject matter disclosed in detail below is a process for extending the operating temperature range of plastic optical fiber, the method comprising: (a) placing a portion of a length of plastic optical fiber inside a thermal chamber and opposing ends of the plastic optical fiber outside the thermal chamber, wherein the plastic optical has a core with dopant distributed in a polymer matrix such that the plastic optical fiber has a high-data-rate capability at a first temperature but not at a second temperature which is higher than the first temperature; (b) decreasing a temperature inside the thermal chamber until a third temperature lower than the first temperature is reached; (c) maintaining the third temperature inside the thermal chamber for a first period of time sufficient to cause the plastic optical fiber to develop the high-data-rate capability at the second temperature; (d) increasing the temperature inside the thermal chamber until a fourth temperature lower than the first temperature and higher than the third temperature is reached; (e) maintaining the fourth temperature inside the thermal chamber during a second period of time subsequent to the first period of time; and (f) removing the plastic optical fiber from the thermal chamber.

The process described in the immediately preceding paragraph may further comprise: (g) optically coupling an optical transceiver to the opposing ends of the plastic optical fiber; and (h) electrically coupling a bit-error-rate tester to the optical transceiver, wherein steps (g) and (h) are performed after step (a) and before step (b). In this case, the process further comprises: (i) testing the bit error rate of the plastic optical fiber at the high data rate. Step (i) may be performed twice: after step (h) and before step (b) and after step (e) and before step (f).

A further aspect of the subject matter disclosed in detail below is a data transmission system comprising: an optical cable comprising a plastic optical fiber having first and second ends; a first transceiver optically coupled to the first end of the plastic optical fiber, the first transceiver comprising a laser disposed to transmit light into the plastic optical filter; a first electrical device configured for sending electrical signals representing data, the first electrical device being electrically coupled to the first transceiver; a second transceiver optically coupled to the second end of the plastic optical fiber, the second transceiver comprising a photodetector disposed to receive light from the plastic optical filter; a second electrical device configured for receiving electrical signals representing data, the second electrical device being electrically coupled to the second transceiver, wherein the plastic optical fiber has a data rate capability of at least 10 gigabits per second at 100° C. The plastic optical fiber is graded-index plastic optical fiber having a core and a cladding made of a transparent carbon-hydrogen bond-free perfluorinated polymer.

In accordance with one proposed implementation of the data transmission system described in the immediately preceding paragraph, the first and second electrical devices are line replaceable units of an avionics network system onboard an airplane.

Other aspects of a process for extending the operating temperature range of plastic optical fiber capable of transmitting data at a high rate are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of processes for extending the operating temperature range of plastic optical fiber capable of transmitting data at a high rate are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Various embodiments of a fiber optical network for enabling optical communication between line replaceable units on an airplane at high data transmission rates (e.g., greater than 1 Gbit/sec) will be described in detail below for the purpose of illustration. However, implementation of the fiber optical networks disclosed herein is not limited solely to the environment of an airplane, but rather may be utilized in fiber optical networks onboard other types of vehicles or other types of fiber optical networks (e.g., long-distance terrestrial, data center and fiber-to-the-home/office applications).

Figure 1:
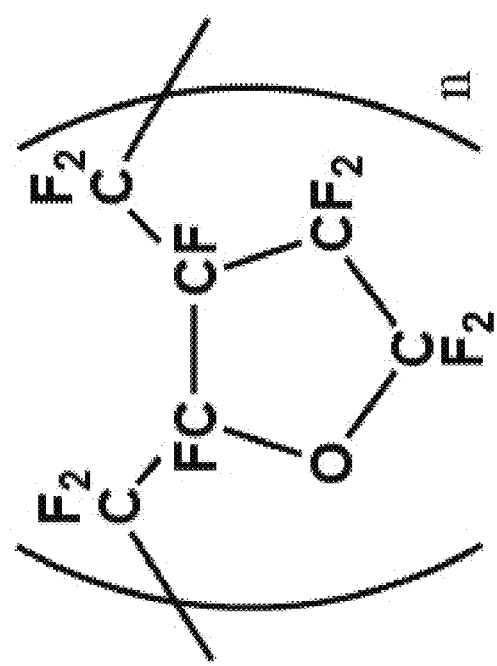
FIG. 1 is a diagram showing the chemical composition of one commercially available transparent carbon-hydrogen bond-free perfluorinated polymer.

FIG. 1 is a structural formula showing the chemical composition of one commercially available transparent carbon-hydrogen bond-free perfluorinated polymer. This graphic representation of the molecular structure shows how the atoms are possibly arranged in the real three-dimensional space. The chemical bonding within the molecule is also shown. The letter "n" indicates that the molecule is a repeating unit in a chain. The perfluorinated polymer depicted in FIG. 1 has fluorine atoms bonded to the carbon atoms instead of having hydrogen atoms bonded to the carbon atoms. An optical fiber having a core and cladding made of perfluorinated polymer enables higher data rates when used in large-capacity communications systems.

Figure 2:
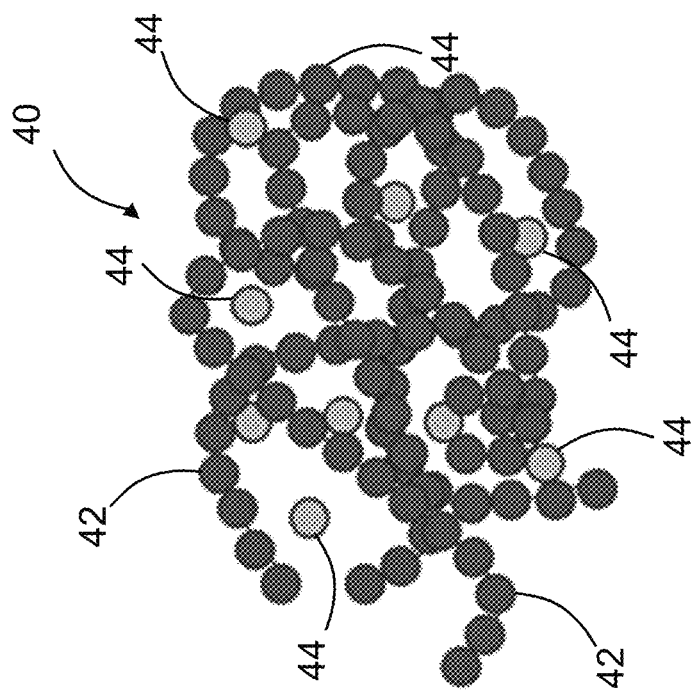
FIG. 2 is a diagram representing the structure of a GbPOF consisting of a doped polymer matrix. The repeating subunits of the linear polymer chains are represented by dark-shaded circles, while the distribution of dopant molecules is represented by light-shaded circles.

Basically, GbPOF is made of long chains of polymers with dopant mixed in the polymer chains. The polymers of the GbPOF are chemically bonded, but the dopant is not chemically bonded to the polymers. This is shown schematically in FIG. 2; the diagram represents the structure of a GbPOF consisting of a doped polymer matrix 40. The repeating subunits of the linear polymer chains 42 are represented by dark-shaded circles, while the distribution of dopant molecules 44 is represented by light-shaded circles. In general, in the case of GbPOF, the dopant molecules are impurities intentionally introduced to the GbPOF polymer chains during the GbPOF fabrication process. Dopant distribution in the host polymers can be altered by high temperature. This is the well-known "impurity diffusion" process, which drives the impurity from a high-density region to a lower-density region.

Figure 3:
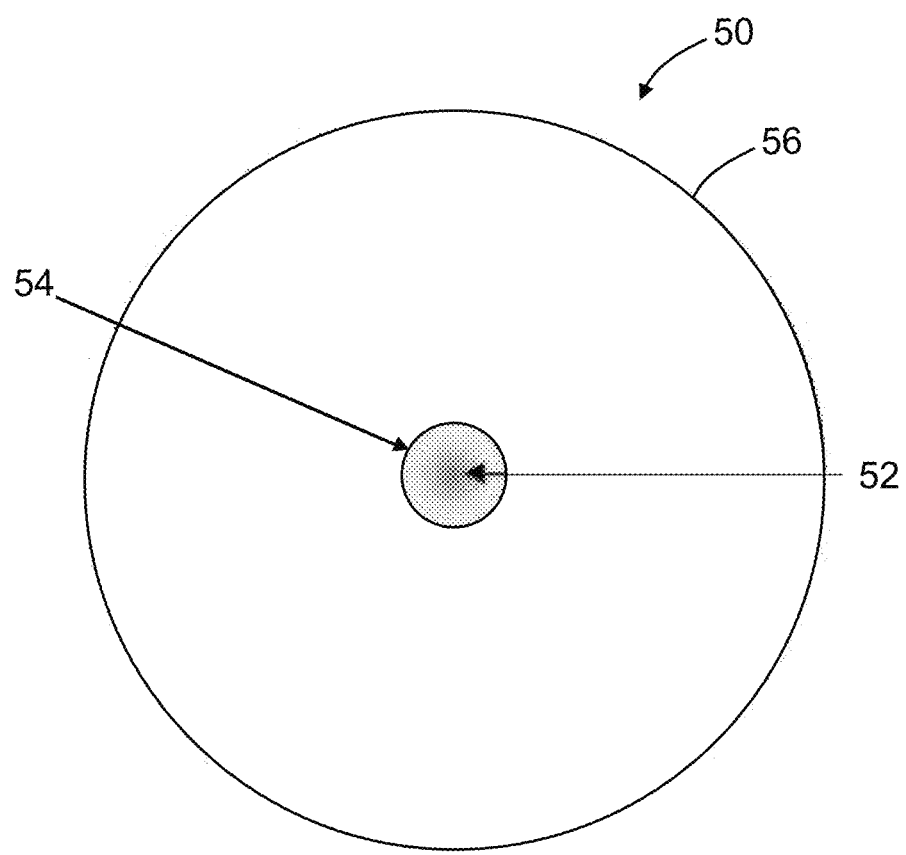
FIG. 3 is a diagram representing a sectional view of a GbPOF consisting of a core made of a doped polymer matrix and a polymer cladding surrounding the core.

FIG. 3 is a diagram representing a sectional view of a graded-index GbPOF 50 consisting of a core 52, a cladding 54 surrounding the core 52, and an over-cladding 56 surrounding the cladding 54. The core 52 and cladding 54 are made of the same transparent carbon-hydrogen bond-free perfluorinated polymer material; the over-cladding 56 is made of a polymeric material. What enables the graded-index GbPOF 50 to operate at high data rates is the dopant that is distributed in the center of the core of the GbPOF with a gradient (or Gaussian) index profile as indicated by shading in FIG. 3. If the distribution of this gradient index profile is altered or degraded, the bandwidth of the GbPOF will change and the GbPOF will not be able to support the high data rate operation. In the case of graded-index GbPOF 50, a high-dopant-density region is located at the center of the core 52 (indicated by dark shading); the low-dopant-density region is located in the outer core region (indicated by light shading). The dopant diffusion process is enhanced by high temperature. This is the primary reason why one supplier limits the operation of a commercially available GbPOF to 70° C. This dopant-out diffusion process is enhanced by the thermal activity of the polymer chains in the host GbPOF. If the thermal activity of the polymer chains is reduced, then the redistribution of the dopant is reduced.

This disclosure proposes a process for treating the GbPOF to stabilize or "lock-in" the distribution of dopant in the optical polymer matrix of the core 52 by rapid cooling. Experiments were performed which demonstrated that the rapid cooling process proposed herein enables the commercially available GbPOF to operate with a bandwidth up to 10 Gbits/sec at a temperature of 100° C. More specifically, experiments were performed to determine the effects of exposing a commercially available GbPOF to a temperature of 100° C. for 24 hours. The experimental findings showed that the transparency of the commercially available GbPOF was not adversely affected by extended exposure to a temperature of 100° C., but the bandwidth was adversely affected by extended exposure to a temperature of 100° C.

Figure 4:
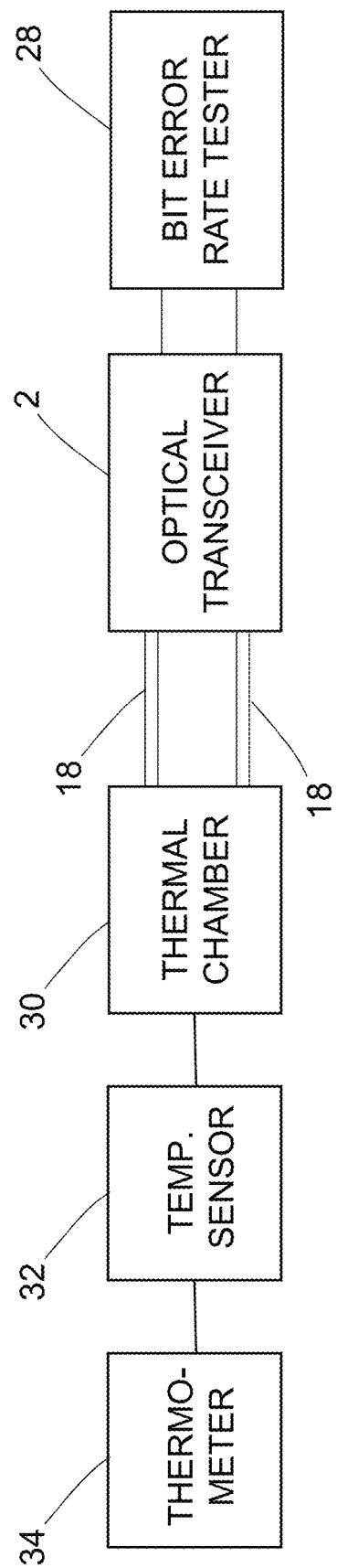
FIG. 4 is a block diagram identifying components of an experimental set up for rapid cooling of loops of GbPOF.

FIG. 4 is a block diagram identifying components of an experimental set-up for rapid cooling of loops of GbPOF. The experimental set-up includes a thermal chamber 30, a temperature sensor 32 (e.g., a thermocouple) which is thermally coupled to the inside the thermal chamber 30, and a thermometer 34 which is electrically coupled to the temperature sensor 32. The temperature sensor 32 outputs an electrical signal that is a measure of the temperature inside the thermal chamber 30. For example, a thermocouple produces a temperature-dependent voltage as a result of the thermoelectric effect. The thermometer 34 converts this temperature-dependent voltage into a numerical value that is displayed on a display screen.

A host computing system (not shown in FIG. 4) is in communication with a data system by which a technician can download various parameters and profiles. The downloaded parameters include a desired setpoint chamber temperature at which to operate the thermal chamber 30 during the rapid cooling process disclosed herein. To attain this setpoint chamber temperature within the thermal chamber, a processor runs software that implements a dual-loop feedback control system based on temperatures measured in the thermal chamber 30.

The experimental design was to treat three loops of graded-index GbPOF differently and then measure the respective properties of the loops to determine the differences attributable to the treatment process used. As depicted in FIG. 4, each loop of GbPOF 18 was placed inside the thermal chamber 30, but the respective ends of the GbPOF 18 were passed through the wall of and located exterior to the thermal chamber 30.

Still referring to FIG. 4, the experimental set-up further includes an optical transceiver 2 capable of transmitting and receiving data at a rate of at least one gigabit per second and a bit-error-rate tester 28 which is electrically coupled to the optical transceiver 2. In addition, the ends of the GbPOF 18 are optically coupled to the optical transceiver 2. During testing, the optical transceiver 2 transmitted and received data at a rate of 10 gigabits per second via the GbPOF 18. During data transmission, the temperature inside the thermal chamber 30 was controlled to be close to if not exactly equal to a specified target temperature to which the loop of GbPOF 18 inside the thermal chamber 30 was exposed. The actual temperature inside the thermal chamber 30 was measured by the temperature sensor 32 and displayed by the thermometer 34.

Figure 5:
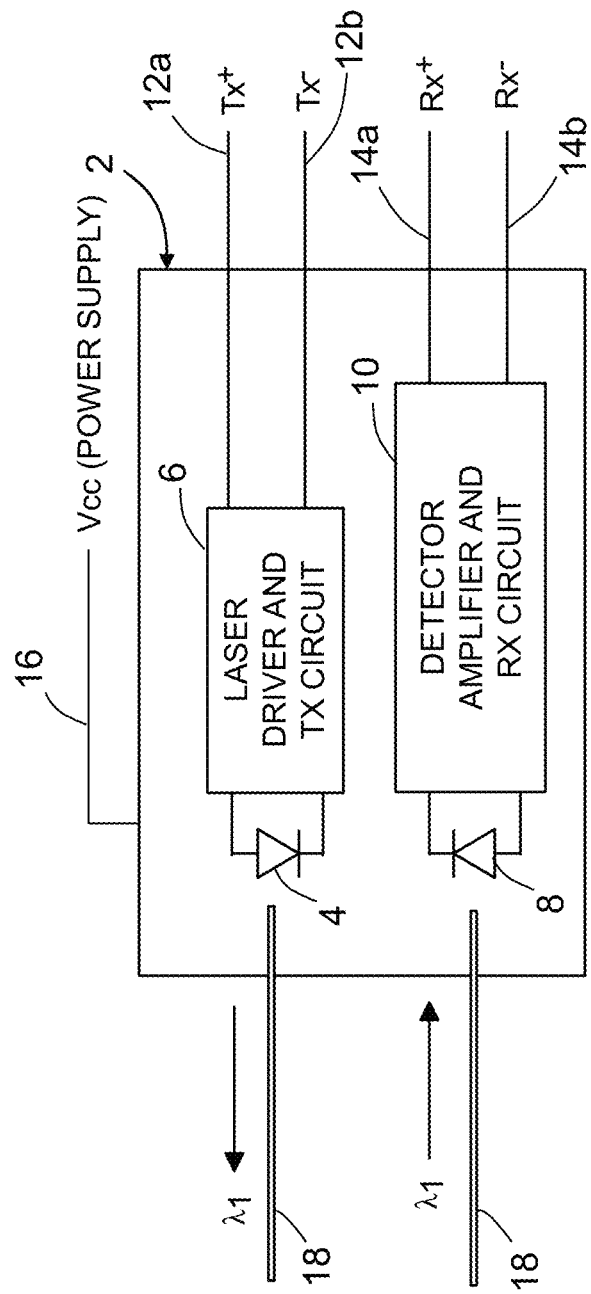
FIG. 5 is a diagram identifying some features of a dual-fiber bidirectional transceiver design in which the transceiver transmits and receives light of the same wavelength.

FIG. 5 is a diagram identifying some components of a dual-fiber bidirectional optical transceiver 2 (hereinafter "optical transceiver") suitable for use in an experimental set-up of the type described herein. The optical transceiver 2 transmits and receives light of the same wavelength. [As used herein, the term "wavelength" in the context of coherent laser light means the center wavelength of laser light having a narrow bandwidth.] In this example, the optical transceiver 2 includes a laser 4 and a photodetector 8. The laser 4 is optically coupled to one end of the GbPOF 18, while the photodetector 8 is optically coupled to the other end of the GbPOF 18. The laser 4 is driven to emit light of a wavelength $\lambda_1$ by a laser driver and transmit circuit 6 in response to receipt of differential transmit signals Tx⁺ and Tx⁻ from the bit-error-rate tester 28 (not shown in FIG. 5) via transmit electrical signal lines 12*a* and 12*b* respectively. The laser driver and transmit circuit 6 comprises electrical circuitry that converts those electrical differential signals to electrical digital signals representing the data to be transmitted by the laser 4. Conversely, the photodetector 8 receives light of wavelength $\lambda_1$ and converts that detected light into electrical digital signals which are provided to a detector amplifier and receive circuit 10. The detector amplifier and receive circuit 10 in turn comprises electrical circuitry that converts those electrical digital signals to electrical differential receive signals Rx⁺ and Rx⁻ representing the data received. The electrical differential receive signals Rx⁺ and Rx⁻ are transmitted to the bit-error-rate tester 28 via receive electrical signal lines 14*a* and 14*b* respectively. The single-wavelength dual-fiber bidirectional transceiver 2 receives electrical power having a voltage $V_{cc}$ via transceiver power supply line 16.

In the experiments that were conducted, three loops of commercially available graded-index GbPOF, each 30 meters in length, were labeled as Loop #1, Loop #2 and Loop #3. These three loops of GbPOF were tested for bit-error rate using a 10 Gbits/sec optical signal at room temperature. All three loops were operating properly without any bit error at room temperature. After the bit-error-rate testing, the temperature treatment disclosed herein was applied to the three loops of GbPOF as follows:

Loop #1 was placed in a thermal chamber 30 with an optical signal coupled into the loop and then rapidly cooled to −55° C. The temperature inside thermal chamber 30 was maintained at −55° C. for one hour before warming back to room temperature.

Loop #2 was placed in the thermal chamber 30 without an optical signal coupled into the loop and then rapidly cooled to −55° C. The temperature inside thermal chamber 30 was maintained at −55° C. for one hour before warming back to room temperature.

Loop #3 was not placed in the thermal chamber 30 and was not treated with any cooling process.

After rapid cooling of GbPOF Loop #1 and Loop #2, all three GbPOF loops were put inside another thermal oven (not shown), which was then set to a temperature of 100° C. for over 24 hours. During the 24 hours, the optical losses of the three loops were monitored and recorded every 15 minutes. The optical power coupled into each GbPOF loop was stable without any degradation, meaning that the transparency of the GbPOF is not adversely affected by operation at high temperature.

The results of heating the three loops GbPOF to a temperature of 100° C. showed that the commercially available GbPOF loops did not suffer any optical loss with a long duration of 100° C. heating. After the heating process, bit-error-rate testing was performed at −55° C., room temperature and 100° C. for Loops #1, #2 and #3 at a data rate of 10 Gbits/sec. The results of the bit-error-rate testing for the three loops were then compared. The bit-error-rate test results showed that Loop #2 had no bit errors for all three temperatures.

Eye diagram testing was also performed for at a data rate of 10 Gbits/sec on all three GbPOF loops at −55° C., room temperature and 100° C. The results showed that all three GbPOF loops were operating satisfactorily at 10 Gbits/sec after the extended 100° C. heating process.

In addition, near-field optical measurements of the three loops of GbPOF were made after heating for more than 24 hours at a temperature of 100° C. The near-field test results showed that Loop #2 had a higher concentration of the optical power in the core of the GbPOF loop than did Loops #1 and #3.

In summary, after the 100° C. heating process, the results showed that Loop #2 had the best high-data-rate (up to 10 Gbits/sec) performance after more than 24 hours of 100° C. heating. Loop #2 also showed the best confinement of the optical signal to the center of the fiber core according to the near-field measurement results, which indicates that the dopant concentration profile is better maintained in Loop #2 than in the other two loops after the extended 100° C. heating process. These experimental results are consistent with the theory (described above) that if the distribution of the gradient index profile is altered or degraded, the bandwidth of the GbPOF will change and will not be able to support high-data-rate operation. Furthermore, Loops #1 and #2 were both rapidly cooled, but Loop #2 had no optical injection during the cooling process, which indicates that the carbon-hydrogen bond-free perfluorinated polymer is more stable without the optical excitation during the rapid thermal "lock-in" process.

Figure 6A:
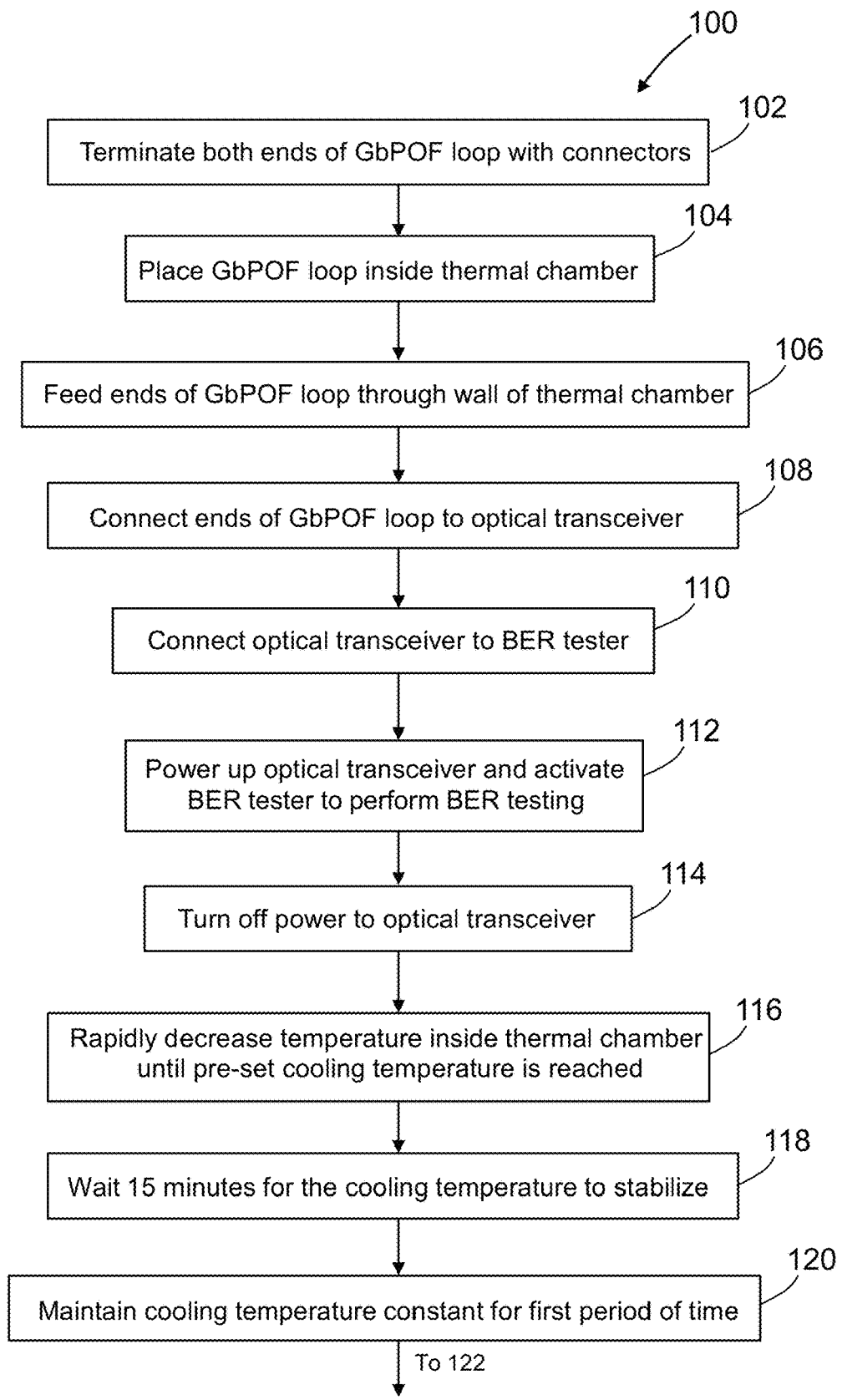
FIGS. 6A and 6B are respective portions of a flowchart identifying steps of a process for extending the operating temperature range of gigabit plastic optical fiber in accordance with one embodiment.
Figure 6B:
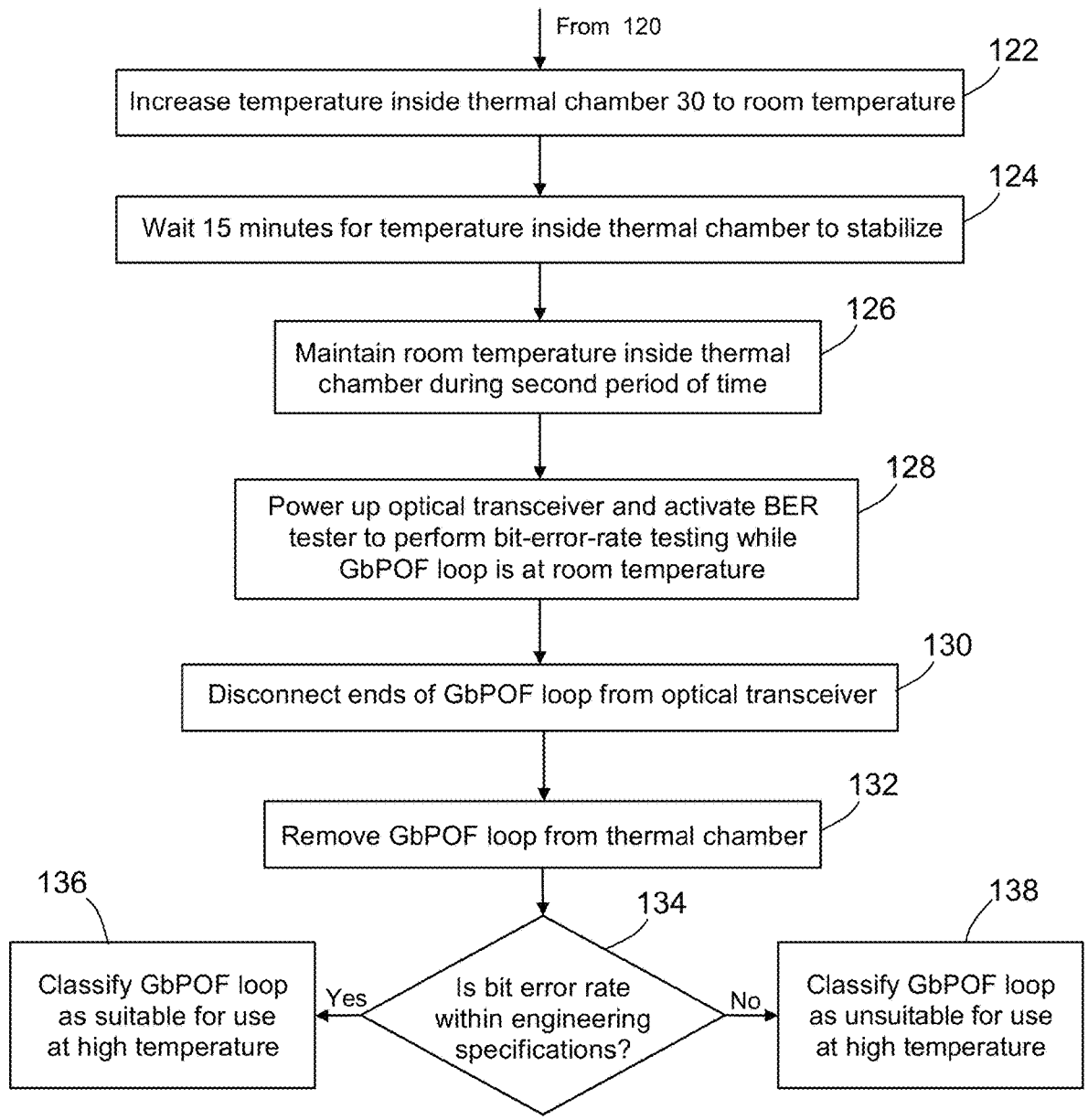

FIGS. 6A and 6B are respective portions of a flowchart identifying steps of a process 100 for extending the operating temperature range of gigabit plastic optical fiber in accordance with one embodiment. More specifically, a rapid thermal cooling process is proposed herein to enhance the high-data-rate operation of a commercially available GbPOF at temperatures up to 100° C.

To start the process 100 (see FIG. 6A), both ends of the GbPOF loop are terminated with the required length with proper connectors, typically LC (Lucent Corporation) connectors (step 102). LC connectors are push-pull connectors that utilize a latch to connect to a device. The GbPOF loop is then placed inside a thermal chamber 30 with side feed through for the GbPOF loop (step 104). The two terminated ends of the GbPOF loop are then fed through the side wall of the thermal chamber (step 106). The result of steps 104 and 106 is that a portion of a length of the GbPOF loop is placed inside the thermal chamber 30 while opposing ends of the GbPOF loop are outside the thermal chamber 30. The GbPOF has a core with dopant distributed in a polymer matrix such that the plastic optical fiber has a high-data-rate capability at a first temperature (e.g., 70° C.) but not at a second temperature (e.g., 100° C.).

Still referring to FIG. 6A, the terminated ends of the GbPOF loop are then connected to an optical transceiver 2 having the capability to transmit data at a data rate of 10 Gbits/sec (step 108). A first end of the GbPOF is optically coupled to the transmitter of the optical transceiver 2; a second end of the GbPOF is optically coupled to the receiver of the optical transceiver 2. The optical transceiver 2 is then connected to the bit-error-rate (BER) tester 28 (step 110). Then the optical transceiver 2 is powered up and the bit-error-rate tester 28 is activated to perform bit-error-rate testing to make sure no bit errors are occurring (step 112). After the bit-error-rate testing has been completed, the electric power to the optical transceiver 2 is turned off to make sure no optical signal is coupled to the GbPOF loop during the cooling process (step 114).

The temperature inside the thermal chamber 30 is then rapidly decreased until a pre-set cooling temperature (referred to as the "third temperature" in the claims) is reached (step 116). The cooling temperature is in a range of −55° C. to −65° C. The technician then waits 15 minutes for the cooling temperature inside the thermal chamber 30 to stabilize (step 118). Following stabilization of the cooling temperature, the cooling temperature inside the thermal chamber 30 is maintained substantially constant for a first period of time (e.g., for one hour) sufficient to cause the GbPOF to develop a high-data-rate capability at high temperature (e.g., 100° C.) (step 120). Referring now to FIG. 6B, the temperature inside the thermal chamber 30 is then increased until a temperature (referred to as the "fourth temperature" in the claims) higher than the cooling temperature is reached (step 122). In accordance with one proposed implementation, the "fourth temperature" is room temperature. The technician then waits 15 minutes for the fourth temperature inside the thermal chamber 30 to stabilize (step 124). The fourth temperature is maintained inside the thermal chamber during a second period of time (e.g., one-half hour) subsequent to the first period of time (step 126). All changes in the temperature inside the thermal chamber are initiated by the technician interfacing with an input device that sets the target temperature inside the thermal chamber 30.

Upon completion of the cooling process, the optical transceiver 2 is powered up and the bit-error-rate tester 28 is activated to perform bit-error-rate testing while the GbPOF loop is still inside the thermal chamber 30 at room temperature (step 128). Upon completion of the bit-error-rate test, the ends of the GbPOF loop are disconnected from the optical transceiver (step 130) and then the GbPOF loop is removed from the thermal chamber (step 132).

The technician then analyzes the bit-error-rate test results. A determination is made whether the test results show that the bit error rate is within engineering specifications or not (step 134). On the one hand, if a determination is made in step 134 that the bit error rate is within engineering specifications, then the GbPOF loop is classified as being suitable for use in a high-temperature environment (step 136). On the other hand, if a determination is made in step 134 that the bit error rate is not within engineering specifications, then the GbPOF loop is classified as being unsuitable for use in a high-temperature environment (step 138).

In accordance with an alternative embodiment of a process for extending the operating temperature range of GbPOF, a GbPOF loop may be placed inside a thermal chamber 30 and cooled without performing bit-error-rate testing while the GbPOF loop is inside the thermal chamber 30. The GbPOF has a core with dopant distributed in a polymer matrix such that the plastic optical fiber has a high-data-rate capability at a first temperature but not at a second temperature which is higher than the first temperature. The temperature inside the thermal chamber 30 is decreased until a third temperature lower than the first temperature is reached. The third temperature inside the thermal chamber 30 is maintained for a first period of time sufficient to cause the GbPOF to develop the high-data-rate capability at the second temperature. Then the temperature inside the thermal chamber 30 is increased until a fourth temperature lower than the first temperature and higher than the third temperature is reached. The fourth temperature inside the thermal chamber 30 is then maintained during a second period of time subsequent to the first period of time. Thereafter the loop of GbPOF is removed from the thermal chamber 30.

An optical cable including a GbPOF 18 which has been cooled and successfully tested as disclosed above may be employed in an avionics network system onboard an aircraft. One example of such a usage will now be described with reference to FIGS. 7-9.

Figure 7:
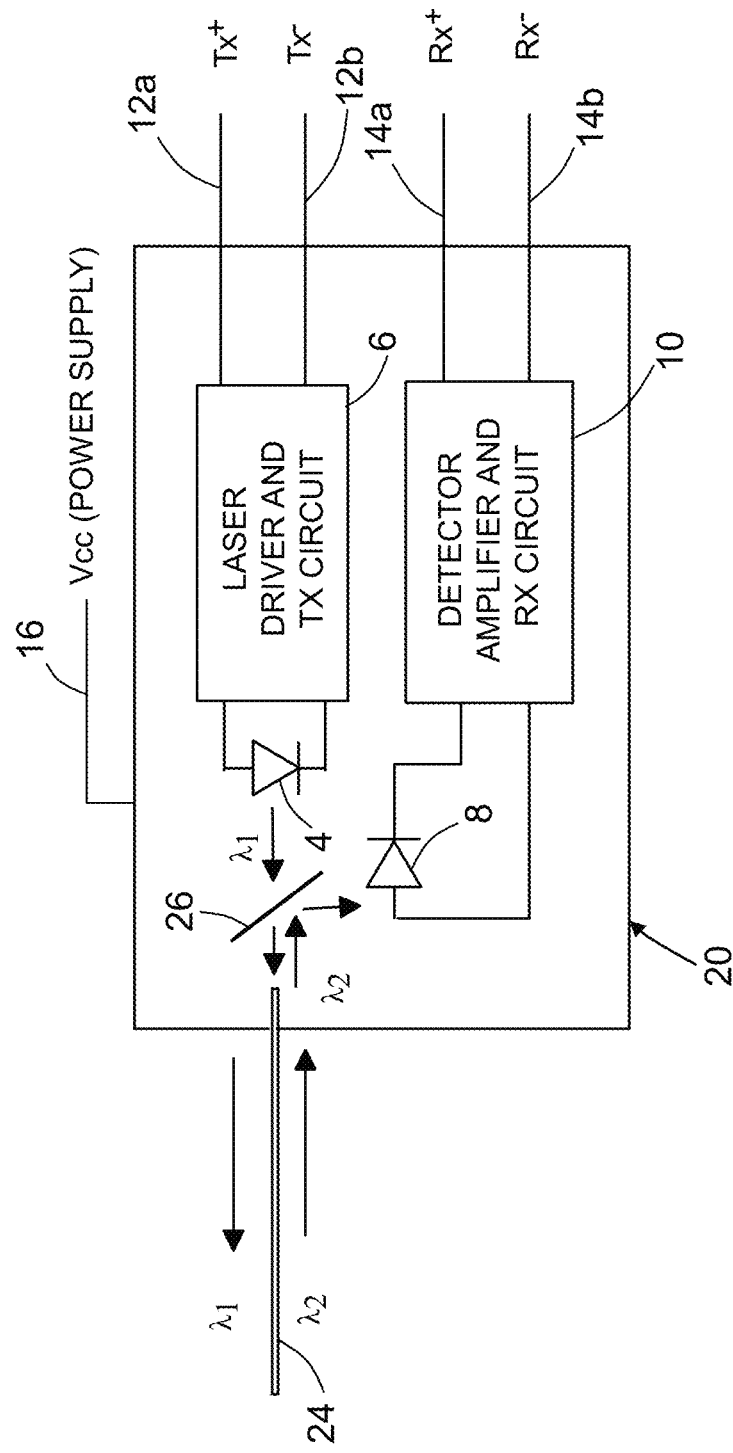
FIG. 7 is a diagram identifying some features of a single-fiber bidirectional transceiver design in which the transceiver transmits light having a first wavelength and receives light having a second wavelength different than the first wavelength.

FIG. 7 is a diagram identifying some features of a single-fiber full-duplex bidirectional transceiver design in which the dual-wavelength single-fiber bidirectional transceiver 20 transmits light having a first wavelength $\lambda_1$ and receives light having a second wavelength $\lambda_2$ different than the first wavelength $\lambda_1$ via the same optical fiber 24. The dual-wavelength single-fiber bidirectional transceiver 20 comprises a laser 4 and a photodetector 8. The laser 4 is driven to emit light of a wavelength $\lambda_1$ by a laser driver and transmit circuit 6 in response to receipt of differential transmit signals Tx+ and Tx− from an associated line replaceable unit (not shown) via transmit electrical signal lines 12a and 12b respectively. The laser driver and transmit circuit 6 comprises electrical circuitry as previously described with reference to FIG. 5. Conversely, the photodetector 8 receives light of wavelength $\lambda_2$ and converts that detected light into electrical digital signals which are provided to a detector amplifier and receive circuit 10. The detector amplifier and receive circuit 10 in turn comprises electrical circuitry as previously described with reference to FIG. 5.

The dual-wavelength single-fiber bidirectional transceiver 20 depicted in FIG. 7 is capable of single-fiber operation because it is equipped in its optical front end with a wavelength-division multiplexing (WDM) filter (hereinafter "WDM filter 26") which passes the optical signal from the laser 4 at one wavelength $\lambda_1$ and reflects the received optical signal at a different wavelength $\lambda_2$ toward the photodetector 8. The WDM filter 26 inside of the dual-wavelength single-fiber bidirectional transceiver 20 is a wavelength-selective bandpass filter designed in accordance with a high cross-talk isolation technique. Use of such isolation ensures that the optical signal from the local laser 4 is not detected by the receiver in the same bidirectional transceiver.

Figure 8:
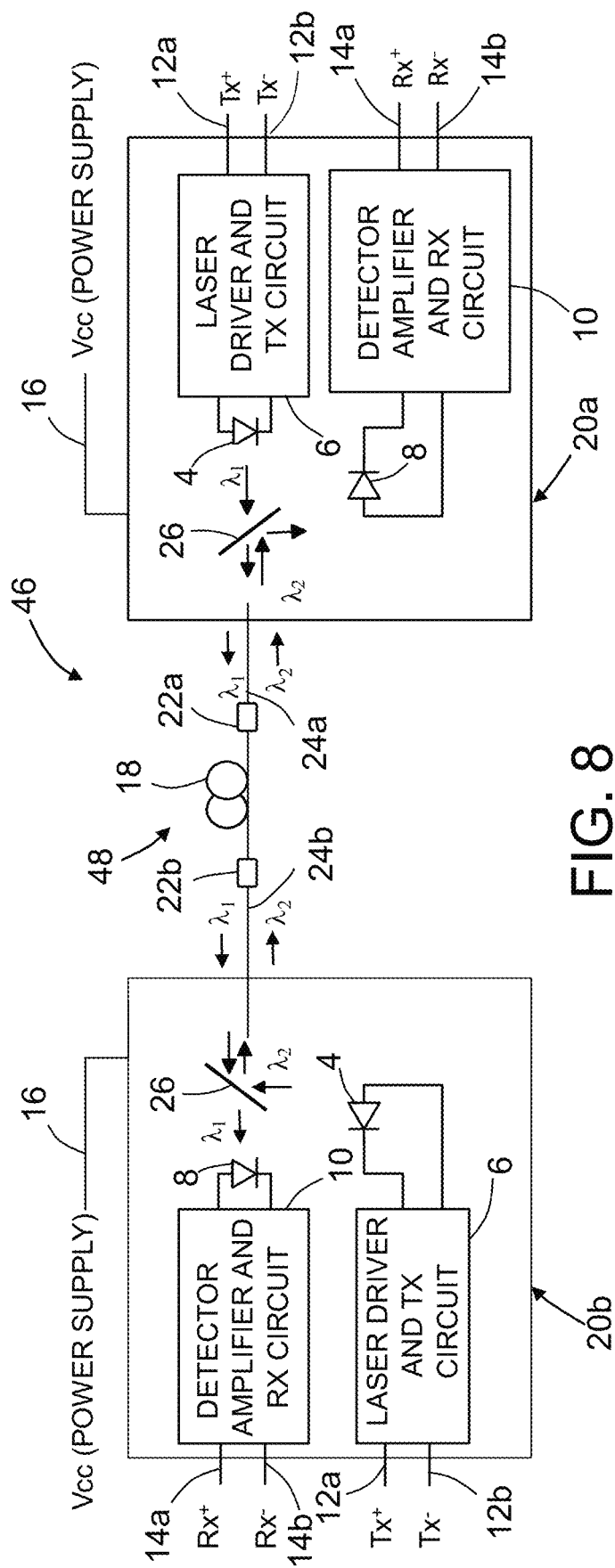
FIG. 8 is a diagram identifying some features of a bidirectional full-duplex data transmission system comprising one pair of dual-wavelength single-fiber bidirectional transceivers, each dual-wavelength single-fiber bidirectional transceivers being of the type depicted in FIG. 7.

FIG. 8 is a diagram identifying some features of a bidirectional full-duplex data transmission system 46 comprising one pair of dual-wavelength single-fiber bidirectional transceivers 20a and 20b, each dual-wavelength single-fiber bidirectional transceiver 20a and 20b being of the type depicted in FIG. 7. In this example, the laser 4 of the dual-wavelength single-fiber bidirectional transceiver 20a is optically coupled to emit light toward the photodetector 8 of the dual-wavelength single-fiber bidirectional transceiver 20b via an optical cable 48 comprising an optical fiber 24a, a connector 22a, a GbPOF 18 which has been subjected to the rapid cooling treatment disclosed herein, a connector 22b and an optical fiber 24b connected in series. The laser 4 of the dual-wavelength single-fiber bidirectional transceiver 20b is optically coupled to emit light toward to the photodetector 8 of the dual-wavelength single-fiber bidirectional transceiver 20a via the same optical cable 48. The dual-wavelength single-fiber bidirectional transceiver 20a transmits light having a wavelength $\lambda_1$ and receives light having a wavelength receives $\lambda_2$. Conversely, the dual-wavelength single-fiber bidirectional transceiver 20b transmits light having a wavelength $\lambda_2$ and receives light having a wavelength $\lambda_1$. Each of the dual-wavelength single-fiber bidirectional transceivers 20a and 20b comprises a WMD filter 26 that passes light having a wavelength $\lambda_1$ and reflects light having a wavelength $\lambda_2$. The bidirectional full-duplex data transmission system 46 depicted in FIG. 8 is capable of transmitting data at a rate greater than 1 Gbit/sec in either direction while exposed to a temperature of 100° C. due to the presence of GbPOF 18 in the optical cable 48.

Figure 9:
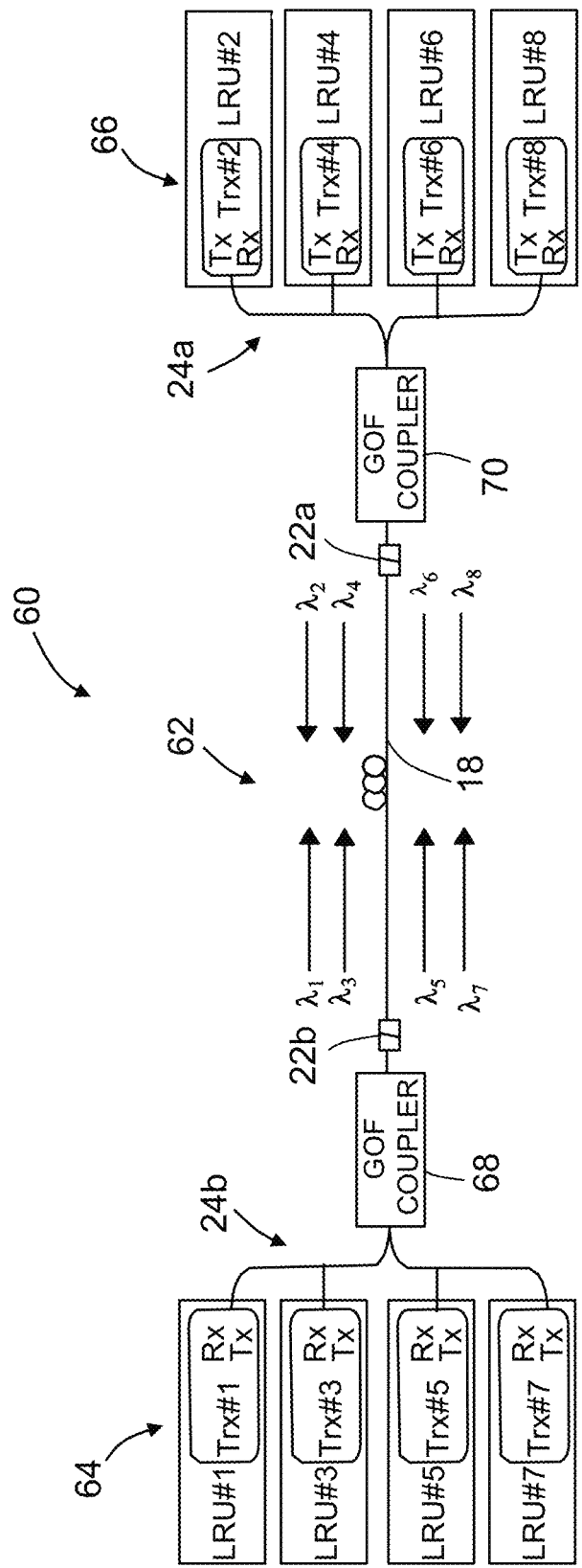
FIG. 9 is a diagram identifying components of a bidirectional full-duplex data transmission system having one full-duplex optical cable connecting the dual-wavelength single-fiber bidirectional transceivers of one set of line replaceable units to the dual-wavelength single-fiber bidirectional transceivers of another set of line replaceable units, each dual-wavelength single-fiber bidirectional transceiver transmitting light at a different wavelength.

FIG. 9 shows a fiber optical network that uses four pairs of bidirectional transceivers Trx #1-Trx #8 (of the type depicted in FIG. 7) with an optical cable 62 comprising a GbPOF 18 which has been subjected to the rapid cooling treatment disclosed herein. More specifically, FIG. 9 shows a bidirectional full-duplex data transmission system 60 having one full-duplex optical cable 62 for optically coupling four dual-wavelength single-fiber bidirectional transceivers Trx #1, Trx #3, Trx #5 and Trx #7 of one LRU set 64 of line replaceable units LRU #1, LRU #3, LRU #5 and LRU #7 to four dual-wavelength single-fiber bidirectional transceivers Trx #2, Trx #4, Trx #6 and Trx #8 of another LRU set 66 of line replaceable units LRU #2, LRU #4, LRU #6 and LRU #8. The eight dual-wavelength single-fiber bidirectional transceivers Trx #1-Trx #8 transmit light having different wavelengths $\lambda_1$ to $\lambda_8$.

In accordance with one embodiment, the bidirectional full-duplex data transmission system 60 comprises a first set of four glass optical fibers 24a, a first glass optical fiber coupler 70 connected to the first set of four glass optical fibers 24a, a second set of four glass optical fibers 24b and a second glass optical fiber coupler 68 connected to the second set of four glass optical fibers 24b. The four glass optical fibers 24a optically couple the glass optical fiber coupler 70 to the dual-wavelength single-fiber bidirectional transceivers Trx #2, Trx #4, Trx #6 and Trx #8, while the four glass optical fibers 24b optically couple the glass optical fiber coupler 68 to the dual-wavelength single-fiber bidirectional transceivers Trx #1, Trx #3, Trx #5 and Trx #7. The bidirectional full-duplex data transmission system 60 further comprises a GbPOF 18 having one end connected to glass optical fiber coupler 70 by a connector 22a and another end connected to glass optical fiber coupler 68 by a connector 22b. The GbPOF 18 has a data rate capability of at least 10 gigabits per second at 100 degrees Celsius.

The laser 4 in the transmitters of the bidirectional transceivers can be implemented with single-mode distributed feedback lasers, multi-mode Fabry-Pérot lasers or vertical cavity surface-emitting lasers for high optical output power and low modal noise.

The photodetector 8 in the receivers of the bidirectional transceivers can be implemented with a high-responsivity p-type intrinsic n-type (PIN) photodiode or an avalanche photodiode to provide high receiver sensitivity.

In accordance with one embodiment, each of the glass optical fiber couplers 68 and 70 shown in FIG. 9 comprises a 4x1 mode-independent multi-mode optical coupler (formed by heat fusing glass) that optically couples a respective set of four bidirectional transceivers to the opposing ends of the GbPOF 18. Respective ultra-low-reflection connectors 22a and 22b are used to connect the outputs of the glass optical fiber couplers 68 and 70 to the opposing ends of the GbPOF 18. For example, the end face of the glass optical fiber on one side of the glass optical fiber couplers and the confronting end face of the GbPOF 18 are angled and polished. The ultra-low-reflection connectors 22a and 22b are formed with a small angle at those end faces.

Although the embodiment depicted in FIG. 9 comprises a forward set of four line replaceable units optically communicating with an aft set of four line replaceable units on an airplane, the concepts disclosed herein may be applied in situations where the number of line replaceable units in each of the forward and aft sets is different than four, for example, as few as two and perhaps as many as sixteen if the resulting optical losses are acceptable.

While processes for extending the operating temperature range of plastic optical fiber capable of transmitting data at a high rate have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

As used in the claims, the phrase "high-data-rate capability" means that the plastic optical fiber is capable of carrying data at a high data rate. As used in the claims, the term "high data rate" means a data rate of at least one gigabit per second.

The invention claimed is:

1. A process for extending the operating temperature range of plastic optical fiber, the method comprising:
   (a) placing a loop of plastic optical fiber inside a thermal chamber, which plastic optical fiber has a core with dopant distributed in a polymer matrix such that the plastic optical fiber has a high-data-rate capability at a first temperature but not at a second temperature which is higher than the first temperature;
   (b) decreasing a temperature inside the thermal chamber until a third temperature lower than the first temperature is reached;
   (c) maintaining the third temperature inside the thermal chamber for a first period of time sufficient to cause the plastic optical fiber to develop the high-data-rate capability at the second temperature;
   (d) increasing the temperature inside the thermal chamber until a fourth temperature lower than the first temperature and higher than the third temperature is reached;
   (e) maintaining the fourth temperature inside the thermal chamber during a second period of time subsequent to the first period of time; and
   (f) removing the loop of plastic optical fiber from the thermal chamber,
   wherein the third temperature is in a range of −55 to −65 degrees Celsius.

2. The process as recited in claim 1, wherein the fourth temperature is room temperature.

3. The process as recited in claim 1, wherein the second temperature is 100 degrees Celsius.

4. The process as recited in claim 1, wherein the plastic optical fiber is graded-index plastic optical fiber having a core and a cladding made of a transparent carbon-hydrogen bond-free perfluorinated polymer.

5. The process as recited in claim 1, wherein following completion of steps (a) through (f), the plastic optical fiber has a data rate capability up to 10 gigabits per second at 100 degrees Celsius.

6. The process as recited in claim 5, further comprising installing the plastic optical fiber in an avionics network system onboard an aircraft after step (f).

7. A process for extending the operating temperature range of plastic optical fiber, the method comprising:

(a) placing a portion of a length of plastic optical fiber inside a thermal chamber and opposing ends of the plastic optical fiber outside the thermal chamber, wherein the plastic optical has a core with dopant distributed in a polymer matrix such that the plastic optical fiber has a high-data-rate capability at a first temperature but not at a second temperature which is higher than the first temperature;

(b) decreasing a temperature inside the thermal chamber until a third temperature lower than the first temperature is reached;

(c) maintaining the third temperature inside the thermal chamber for a first period of time sufficient to cause the plastic optical fiber to develop the high-data-rate capability at the second temperature;

(d) increasing the temperature inside the thermal chamber until a fourth temperature lower than the first temperature and higher than the third temperature is reached;

(e) maintaining the fourth temperature inside the thermal chamber during a second period of time subsequent to the first period of time; and (f) removing the plastic optical fiber from the thermal chamber, wherein the third temperature is in a range of −55 to −65 degrees Celsius.

8. The process as recited in claim 7, further comprising:
(g) optically coupling an optical transceiver to the opposing ends of the plastic optical fiber; and
(h) electrically coupling a bit-error-rate tester to the optical transceiver,
wherein steps (g) and (h) are performed after step (a) and before step (b).

9. The process as recited in claim 8, further comprising:
(i) testing the bit error rate of the plastic optical fiber at the high data rate.

10. The process as recited in claim 9, wherein step (i) is performed after step (h) and before step (b).

11. The process as recited in claim 9, wherein step (i) is performed after step (e) and before step (f).

12. The process as recited in claim 7, wherein the second temperature is 100 degrees Celsius.

13. The process as recited in claim 7, wherein the plastic optical fiber is graded-index plastic optical fiber having a core and a cladding made of a transparent carbon-hydrogen bond-free perfluorinated polymer.

14. The process as recited in claim 7, wherein following completion of steps (a) through (f), the plastic optical fiber has a data rate capability up to 10 gigabits per second at 100 degrees Celsius.

15. The process as recited in claim 14, further comprising installing the plastic optical fiber in an avionics network system onboard an aircraft after step (f).

16. A method for transmitting data comprising:
(a) placing a plastic optical fiber inside a thermal chamber, which plastic optical fiber has a core with dopant distributed in a polymer matrix such that the plastic optical fiber has a high-data-rate capability at a first temperature but not at a second temperature which is higher than the first temperature;

(b) decreasing a temperature inside the thermal chamber until a third temperature lower than the first temperature is reached;

(c) maintaining the third temperature inside the thermal chamber for a first period of time sufficient to cause the plastic optical fiber to develop the high-data-rate capability at the second temperature;

(d) increasing the temperature inside the thermal chamber until a fourth temperature lower than the first temperature and higher than the third temperature is reached;

(e) maintaining the fourth temperature inside the thermal chamber during a second period of time subsequent to the first period of time; and (f) removing the plastic optical fiber from the thermal chamber;

(g) optically coupling a first transceiver to a first end of the plastic optical fiber;

(h) electrically coupling a first electrical device to the first transceiver;

(i) optically coupling a second transceiver to a second end of the plastic optical fiber;

(j) electrically coupling a second electrical device to the second transceiver;

(k) sending electrical signals representing data from the first electrical device to the first transceiver;

(l) transmitting laser light from the first transceiver into the plastic optical filter, which laser light represents the data from the first electrical device;

(m) photodetecting the laser light at the second transceiver into electrical signals representing the data from the first electrical device; and (n) receiving the electrical signals representing the data from the first electrical device at the second electrical device, wherein the third temperature is in a range that includes an upper limit of −55 degrees Celsius.

17. The method as recited in claim 16, wherein the plastic optical fiber is graded-index plastic optical fiber having a core and a cladding made of a transparent carbon-hydrogen bond-free perfluorinated polymer.

18. The method as recited in claim 16, wherein the first and second electrical devices are line replaceable units of an avionics network system onboard an airplane.

19. The method as recited in claim 16, wherein the second temperature is 100 degrees Celsius.

20. The method as recited in claim 16, wherein following completion of steps (a) through (f), the plastic optical fiber has a data rate capability up to 10 gigabits per second at 100 degrees Celsius.

\* \* \* \* \*